US010216916B2

(12) United States Patent
Ahn et al.

(10) Patent No.: US 10,216,916 B2
(45) Date of Patent: *Feb. 26, 2019

(54) METHOD AND APPARATUS FOR CONTROLLING LOCK/UNLOCK STATE OF TERMINAL THROUGH VOICE RECOGNITION

(71) Applicant: Samsung Electronics Co., Ltd., Suwon-si, Gyeonggi-do (KR)

(72) Inventors: Yumi Ahn, Seoul (KR); Seonhwa Kim, Seoul (KR); Heewoon Kim, Suwon-si (KR); Hayoung Jeon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,169

(22) Filed: Feb. 13, 2017

(65) Prior Publication Data
US 2017/0153868 A1 Jun. 1, 2017

Related U.S. Application Data

(63) Continuation of application No. 14/832,240, filed on Aug. 21, 2015, which is a continuation of application (Continued)

(30) Foreign Application Priority Data

Feb. 24, 2012 (KR) .................... 10-2012-0019092

(51) Int. Cl.
G10L 21/00 (2013.01)
G06F 21/32 (2013.01)
(Continued)

(52) U.S. Cl.
CPC .............. *G06F 21/32* (2013.01); *G06F 3/167* (2013.01); *G06F 9/4418* (2013.01); *G10L 15/00* (2013.01);
(Continued)

(58) Field of Classification Search
CPC .... A61M 2205/505; A61M 2205/3592; A61M 5/172; A61M 2205/33; A61M 5/16831
(Continued)

(56) References Cited

U.S. PATENT DOCUMENTS 6,801,765 B1 10/2004 Roo et al.
7,580,724 B2 8/2009 Ueda
(Continued)

FOREIGN PATENT DOCUMENTS

CN 1382005 A 11/2002
CN 201234354 Y 5/2009
(Continued)

OTHER PUBLICATIONS

Jun Ishii, Evolving Mobile Phones—Technologies that Support Variation—Mobile Phone: How Mitsubishi Changes the Technologies—A Wide Variety of Applications by Mobile Communications in Everyday Life-, Mitsubishi Electric Technology Report 81st No. 2, Mitsubishi Electric Engineering Corporation, Feb. 19, 2007, 81st, p. 51-54.
(Continued)

Primary Examiner — Charlotte M Baker
(74) Attorney, Agent, or Firm — Jefferson IP Law, LLP

(57) ABSTRACT

A method for controlling a terminal through a voice input is provided. The method includes receiving a voice input when the terminal is in a state in which the terminal is locked and performing an operation corresponding to the voice input if the voice input corresponds to a preset command.

19 Claims, 10 Drawing Sheets

Related U.S. Application Data

No. 13/774,432, filed on Feb. 22, 2013, now Pat. No. 9,117,454.

(51) Int. Cl.

| | |
|---|---|
| *G06F 3/16* | (2006.01) |
| *H04M 1/67* | (2006.01) |
| *G10L 15/00* | (2013.01) |
| *G06F 9/4401* | (2018.01) |
| *H04M 1/725* | (2006.01) |
| *H04W 52/02* | (2009.01) |
| *G10L 15/26* | (2006.01) |

(52) U.S. Cl.
CPC ............... *G10L 21/00* (2013.01); *H04M 1/67* (2013.01); *H04M 1/72522* (2013.01); *H04W 52/027* (2013.01); *G10L 15/265* (2013.01); *H04M 2250/66* (2013.01); *H04M 2250/74* (2013.01); *Y02D 70/00* (2018.01)

(58) Field of Classification Search
USPC .......... 340/3.2, 1.1, 3.1, 506, 539.1, 539.12, 340/5.51; 600/118, 126, 300; 601/150; 604/890.1, 95.05; 606/26, 38, 42; 607/17, 3, 59, 7; 704/275; 455/569.1
See application file for complete search history.

(56) References Cited

U.S. PATENT DOCUMENTS

| | | | |
|---|---|---|---|
| 8,344,847 B2* | 1/2013 | Moberg | G06F 19/3406 340/1.1 |
| 8,666,751 B2 | 3/2014 | Murthi et al. | |
| 9,031,847 B2 | 5/2015 | Sarin et al. | |
| 2002/0152070 A1 | 10/2002 | Oda | |
| 2003/0078784 A1 | 4/2003 | Jordan et al. | |
| 2005/0118990 A1 | 6/2005 | Stephens | |
| 2007/0073718 A1 | 3/2007 | Ramer et al. | |
| 2008/0082338 A1* | 4/2008 | O'Neil | A61B 5/145 704/275 |
| 2009/0254351 A1 | 10/2009 | Shin et al. | |
| 2010/0216446 A1 | 8/2010 | Chang | |
| 2010/0269040 A1 | 10/2010 | Lee | |
| 2011/0119715 A1 | 5/2011 | Chang et al. | |
| 2011/0195758 A1* | 8/2011 | Damale | H04M 1/6075 455/569.1 |
| 2011/0275348 A1 | 11/2011 | Clark et al. | |
| 2013/0187753 A1* | 7/2013 | Chiriyankandath | G06F 3/0488 340/5.51 |
| 2013/0297319 A1 | 11/2013 | Kim | |
| 2014/0009609 A1 | 1/2014 | Webster et al. | |

FOREIGN PATENT DOCUMENTS

| | | |
|---|---|---|
| CN | 101557432 A | 10/2009 |
| GB | 2 346 045 | 7/2000 |
| JP | 2000-080828 A | 3/2000 |
| JP | 2004-086356 A | 3/2004 |
| JP | 3588441 B2 | 8/2004 |
| JP | 2005-271345 A | 10/2005 |
| JP | 2005-304002 A | 10/2005 |
| JP | 2006-005695 A | 1/2006 |
| JP | 2007-513568 A | 5/2007 |
| JP | 2009-252238 A | 10/2009 |
| KR | 10-2004-003762 A | 1/2004 |
| KR | 100724398 B1 | 6/2007 |
| KR | 10-2011-0105173 A | 9/2011 |
| WO | 2009/137147 A1 | 11/2009 |
| WO | 2010/137859 A2 | 12/2010 |

OTHER PUBLICATIONS

Forum in www.FENG.com arcill "Method for Waking up and Unlocking Screen without Any Key Press", Jan. 15, 2012.
Forum in www.FENG.com cokelight "Teach You How to Use Hands Free Control", Nov. 4, 2011.

* cited by examiner

METHOD AND APPARATUS FOR CONTROLLING LOCK/UNLOCK STATE OF TERMINAL THROUGH VOICE RECOGNITION

CROSS-REFERENCE TO RELATED APPLICATION(S)

This application is a continuation application of prior application Ser. No. 14/832,240, filed on Aug. 21, 2015, which is a continuation application of prior application Ser. No. 13/774,432, filed on Feb. 22, 2013, which has issued as U.S. Pat. No. 9,117,454 on Aug. 25, 2015 and claimed the benefit under 35 U.S.C. § 119(a) of a Korean patent application filed on Feb. 24, 2012 in the Korean Intellectual Property Office and assigned Serial number 10-2012-0019092, the entire disclosure of each of which is hereby incorporated by reference.

BACKGROUND OF THE INVENTION

1. Field of the Invention

The present invention relates generally to a method and an apparatus in which a locked state of a terminal can be released through voice (or other sound) recognition. More particularly, although not exclusively, the present invention relates to a terminal that can perform a command or operation through a command corresponding to a voice input (or other sound input) which is preset by a user.

2. Description of the Related Art

There have been methods for controlling a terminal using voice recognition, and the feature of such methods is in recognizing a user's voice and performing an operation corresponding to the voice. However, according to the related art, in order to recognize voice, a separate input to the terminal is necessary to convert the terminal mode into a mode for inputting voice. Likewise, a separate input is necessary for inputting voice, thereby inconveniencing the user.

Further, in the case of a command through a voice input, only limited preset commands have been possible, and a terminal and a method thereof have often not been able to perform user's desired operations at one time.

Therefore, there is a need for a method and an apparatus for controlling a terminal through voice recognition with improved user convenience.

The above information is presented as background information only to assist with an understanding of the present disclosure. No determination has been made, and no assertion is made, as to whether any of the above might be applicable as prior art with regard to the present invention.

SUMMARY OF THE INVENTION

It is an aim of certain embodiments of the present invention to address, solve, mitigate, or obviate, at least partly at least one of the problems and/or disadvantages associated with the related art, including those mentioned above. Certain embodiments aim to provide at least one of the advantages described below. Accordingly, certain embodiments of the present invention provide a method for controlling a terminal using a voice input and controlling a terminal to perform preset commands at one time using one voice input by allowing a user to set a set of commands corresponding to a voice input.

In accordance with an aspect of the present invention, a method for controlling a terminal through a voice input is provided. The method includes receiving a voice input when the terminal is in a state in which the terminal is locked and performing an operation corresponding to the voice input if the voice input corresponds to a preset command.

In accordance with another aspect of the present invention, a method for controlling a terminal through a voice input is provided. The method includes receiving a voice input when the terminal is in a state in which the terminal is locked, determining whether the voice input corresponds to a preset command, and releasing the locked state and performing an operation corresponding to the voice input if the voice input corresponds to the preset command.

In accordance with another aspect of the present invention, a terminal for being controlled through a voice input is provided. The terminal includes a display unit that displays an operating state of the terminal, a voice input unit that receives a voice input, and a controller that performs an operation corresponding to the voice input if the voice input, which is input through the voice input unit when the terminal is in a state in which the terminal is locked, corresponds to a preset command.

In accordance with another aspect of the present invention, a terminal for being controlled through a voice input is provided. The terminal includes a display unit that displays an operating state of the terminal, a voice input unit that receives a voice input, and a controller that determines whether the voice input, which is input through the voice input unit when the terminal is in a state in which the terminal is locked, corresponds to a preset command, and that releases the locked state and performs an operation corresponding to the voice input if the voice input corresponds to the preset command.

In accordance with some aspects of the present invention, a user generated sound other than voice (e.g., a whistle or the like) may be used to perform an operation corresponding to the user generated sound.

In accordance with another aspect of the present invention, a non-transitory computer readable storage medium storing instructions for operating a terminal such that when the instructions are executed the instructions cause at least one processor to perform steps of a method is provided. The method includes receiving a voice input when the terminal is in a state in which the terminal is locked, and performing an operation corresponding to the voice input if the voice input corresponds to a preset command.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, and features and advantages of certain exemplary embodiments and aspects of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
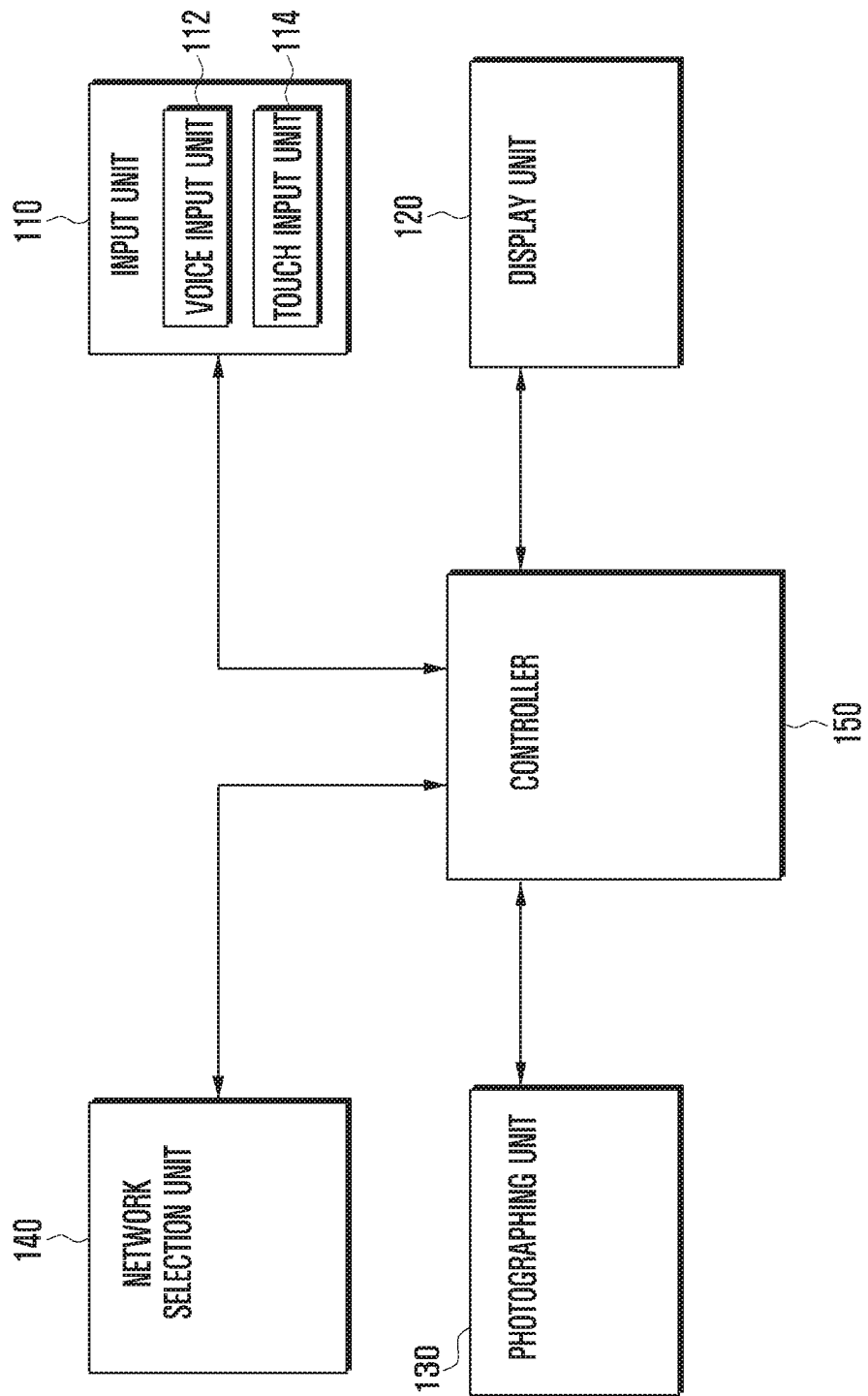
FIG. 1 is a block diagram illustrating the structure of a terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims.

The same or similar components may be designated by the same or similar reference numerals although they are illustrated in different drawings. Detailed descriptions of structures, constructions, functions or processes known in the art may be omitted for clarity and conciseness, and to avoid obscuring the subject matter of the present invention.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, it is to be understood that the singular forms "a," "an," and "the" include plural referents unless the context clearly dictates otherwise, and where the indefinite article is used, the specification is to be understood as contemplating plurality as well as singularity, unless the context requires otherwise. Thus, for example, reference to "an object" includes reference to one or more of such objects.

Features, integers, characteristics, compounds, chemical moieties or groups described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

A terminal according to an exemplary embodiment of the present invention refers to an electronic device such as a mobile phone, a Personal Digital Assistant (PDA), a navigation system, a digital broadcast receiver, a portable multimedia player, and the like.

In accordance with some aspects of the present invention, a user generated sound other than voice (e.g., a whistle or the like) may be used to perform an operation corresponding to the user generated sound.

FIG. 1 is a block diagram illustrating the structure of a terminal according to an exemplary embodiment of the present invention.

Referring to FIG. 1, the terminal can include an input unit 110 which can receive a user's input, a display unit 120 which can display an operating state of the terminal, a photographing unit 130 which can photograph image data according to the user's input, a network selection unit 140 which can select a plurality of networks for communication, and a controller 150 which controls an operation of the terminal.

The input unit 110 can receive other forms of inputs, and can include at least one of a voice (or other sound) input unit 112 which can receive a user's voice input (or other sound produced by the user, such as a whistle or the like), and a touch input unit 114 which can recognize an input by recognizing a user's motion or touch, for example through a touch panel or touch screen.

The voice input unit 112 can recognize the user's voice (or other user generated sound). When recognizing the voice, the difference between the user's voice and other voices (or other sounds) can be distinguished based on at least one of a voice tone, a word according to pronunciation, and intonation. In other words, the terminal may recognize the user's voice based on the tone of a voice input through the voice input unit 112, the pronunciation of a word, and/or the intonation. The content included in the voice (or other sound) input through the voice input unit 112 can be transmitted to the controller 150. The voice (or other sound) is transmitted to the controller 150 depending on the exemplary embodiment of the present invention. According to exemplary embodiments of the present invention, the content included in the controller 150 may be analyzed. For example, in the case of a voice, words of the voice input may be analyzed. In the case of a whistle, the notes of a whistled tune may be analyzed. An operation performed in response to the voice command or other user generated sound may depend on the analyzed content.

According to exemplary embodiments of the present invention, the voice input unit 112 can be operated even in the state in which the touch input unit 114 and/or the display unit 120 are turned off. Further, in order for the terminal not to receive an undesired input from the outside, the voice input unit 112 can be operated even if the terminal is in the locked state. If the terminal is in the locked state, then the display unit 120 may be in an off state. Even if the terminal is in the state in which the display unit 120 is turned on, the input through the touch input unit 114 may be in a non-input state except for a lock release operation. For example, the terminal may be in a state such that although the display unit 120 is turned on, the touch input unit 114 accepts no inputs thereto except for those inputs associated with releasing the terminal from a locked state.

In certain exemplary embodiments of the present invention, even in the state in which components of the terminal except the controller are in the off state, the voice input unit 112 may receive a user's voice input. As such, even in the state in which the terminal is locked, the user can control the terminal through the voice input without a separate input. Further, the user's voice input can be received while reducing power consumption by operating the terminal such that only the voice input unit 112 is in the on state and such that other components are in the off state. For example, to reduce power consumption of the terminal, only those components of the terminal necessary for receiving and processing the user's voice input and the commands associated thereto are in an on state and the other components of the terminal are in an off state. For example, to reduce power consumption of the terminal, only those components of the terminal necessary for receiving and processing the user's voice input and the commands associated thereto are in an on state and the other components of the terminal are in an off state. Further, when the display unit 120 is in a turned-off state, if a voice input is received through the voice input unit 112, an operation of turning on the display unit 120 and displaying the received voice input may be performed. As another example, to reduce power consumption of the terminal, those components of the terminal necessary for receiving and processing the user's voice input and the commands associated thereto are in an on state, and other components of the terminal may be in an off state.

The display unit 120 can display the operating state of the terminal. To this end, a display device such as a Liquid Crystal Display (LCD) and Active Matrix Organic Light-Emitting Display (AMOLED), and the like can be used. Further, a voice command input through the voice input unit 112 can be displayed in the display unit. If the input voice (or other user generated sound) corresponds to a preset command, then the command is outputted or performed, and the operating situation can be displayed. Further, if the input voice (or other user generated sound) does not correspond to a preset command, then the terminal may display that the input voice (or other user generated sound) does not correspond to a preset command.

The photographing unit 130 can photograph image data. The display unit 120 can display photographed images while the photographing unit 130 photographs images. Further, if a command input through the voice input unit 112 corresponds to a preset operating command of the photographing unit 130, the photographing unit 130 can operate in photographing mode. In the photographing mode, image data photographed by the photographing unit 130 according to the user's input which is input through the input unit 110 can be stored. The particular photographing operation performed may be selected according to the voice command (or other command associated with a user generated sound).

The network selection unit 140 can select one or more networks from a plurality of networks, and can be operated in a terminal using a plurality of Subscriber Identification Modules (SIM) depending on the exemplary embodiment of the present invention. Further, even in the case of using a single SIM, it is possible to select a network connected for a user who subscribed to a plurality of networks. In certain exemplary embodiments of the present invention, if a command to use a certain network is input through the voice input unit 112, then the network selection unit 140 can change the network to which the terminal is connected in order to use the certain network, and the terminal may display the fact that the certain network is used in the display unit 120. The network may be selected according to the voice command.

According to exemplary embodiments of the present invention, if the command input through the voice input unit 112 corresponds to a command for replaying media content, the controller 150 may replay certain media content. The media content may be a video or music stored in the controller 150, or a video or music received from an external source. The media content may be selected according to the voice command.

According to an exemplary embodiment of the present invention, if a command input through the voice input unit 112 corresponds to a command for performing a voice or text message transmission, then the controller 150 may transmit a voice message or a text message depending on user's input.

According to an exemplary embodiment of the present invention, if a command input through the voice input unit 112 corresponds to a command for schedule confirmation, for example in a diary application, then the controller 150 may display a screen on which the user can check the user's schedule in the display unit 120.

The above operation can be shown by combination through the voice input setting, which will be explained later.

Figure 2:
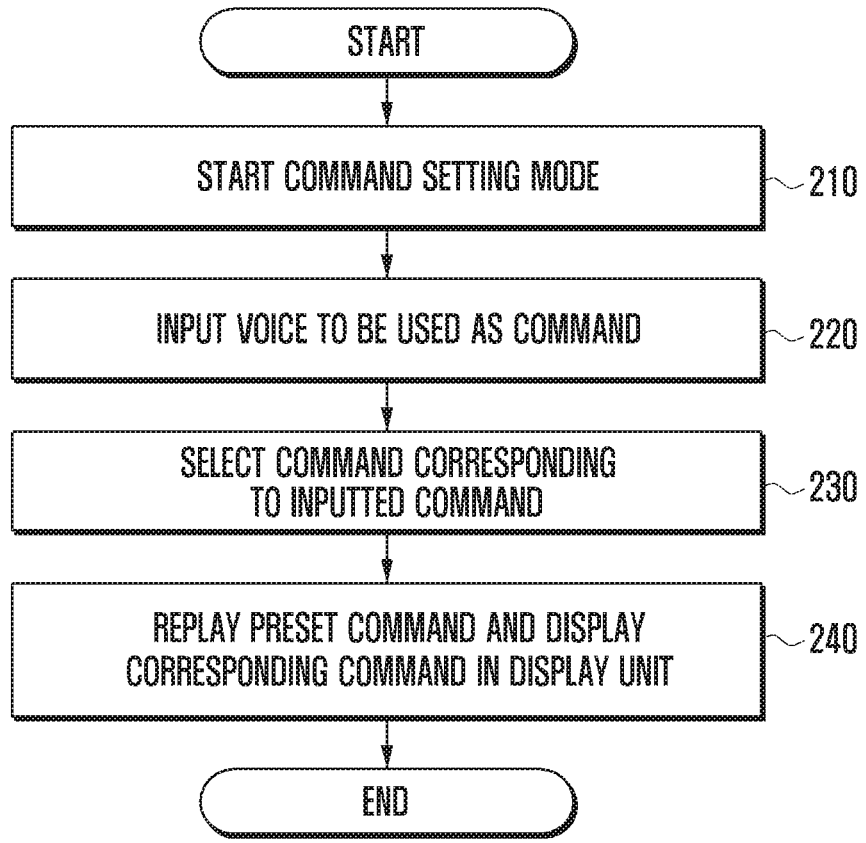
FIG. 2 is a flowchart illustrating a method for setting a user command according to an exemplary embodiment of the present invention.

FIG. 2 is a flowchart illustrating a method for setting a user command (e.g., for associating a voice command with one or more commands that may be performed in the terminal) according to an exemplary embodiment of the present invention.

Referring to FIGS. 1 and 2, the command setting mode can be started at step 210. For example, the command setting mode can be started through an input through the input unit 110. A command setting mode can be started through a voice or touch input according to an exemplary embodiment of the present invention.

If the command setting mode is started, the user's voice input can be received at step 220. For example, the user's voice input can be performed through the voice input unit 112. At this time, because the voice of the same user can be changed (i.e., varied) according to context (e.g., depending on the situation or environment) of the user, the mobile terminal, or the like, the accuracy of the recognition can be increased by receiving the voice input associated with the same command a plurality of times. For example, during the command setting mode, the terminal may request the user to repeat the voice input associated with a command a plurality of times. For example, the input may be received three (or any other suitable number of) times, and if the input voice among the plurality of inputs is not consistent, an additional input may be requested. The step of inputting a voice may include receiving the voice input associated with a command repeatedly until the user command can be recognized from the input voice. Accordingly, in exemplary embodiments of the present invention, even if a user subsequently inputs its voice in a different environment after saving the characteristics of the user's voice, the characteristics of the input voice may be recognized. Further, a command may include any desired or suitable number of words, such as 3 to 5 words. For example, a command may correspond to a phrase.

A command corresponding to the input voice command may be selected at step 230. The command may be at least one of a lock state release, a display unit on, a change to photographing mode, a change to voice recognition mode, voice message transmission and text message transmission. Further, according to exemplary embodiments of the present invention, if a terminal is used by a plurality of users, the command may be an operation for logging into a certain user account. For example, if a terminal is used by a plurality of users, the plurality of users may have corresponding user accounts which may be accessed or otherwise operated by using respective voice inputs stored during the corresponding command setting mode. Further, if a terminal uses a plurality of SIM cards, the command can be a command to select a network.

In certain exemplary embodiments of the present invention, an input command may be associated with a set or sequence of commands, so that a plurality of operations can be performed, possibly in a specific order, through a voice command according to the user's setting. For example, according to an exemplary embodiment of the present invention, if a certain voice command is input, the lock state of the terminal can be released, and the state of the terminal can be converted into the photographing mode.

In certain exemplary embodiments of the present invention, the order of steps 220 and 230 may be changed. For example, it may be possible to first select a command to correspond to a voice command to be input, and then to input a voice to be used as the voice command.

If, in the setting process of the above method, a voice to be used as a voice command is successfully input, and a command corresponding to the input voice command is selected, the voice command can be replayed (e.g., the voice command output through a speaker) and the corresponding command can be displayed in the display unit at step 240. For example, the voice command may be replayed as sound and the corresponding command may be displayed as text in the display unit. In certain exemplary embodiments of the present invention, the words of the voice command may also be displayed as text in the display unit. As another example with regard to the above-set command, the progress state of the command may be displayed in order. According to an exemplary embodiment of the present invention, a corresponding operation may be displayed when displaying a command.

Because a voice command which is set by the user after step 240 and the corresponding command has been set, the user can control a terminal by inputting the preset voice command in the terminal. Likewise, the user can input a voice command and a command corresponding to the command can be combined and selected, and thus the user operability is improved. A plurality of operations can be performed using a macro. Further, by performing a setting method to associate a voice command with frequently used commands, the operation of the terminal can be controlled while reducing the number of operations required.

Figure 3:
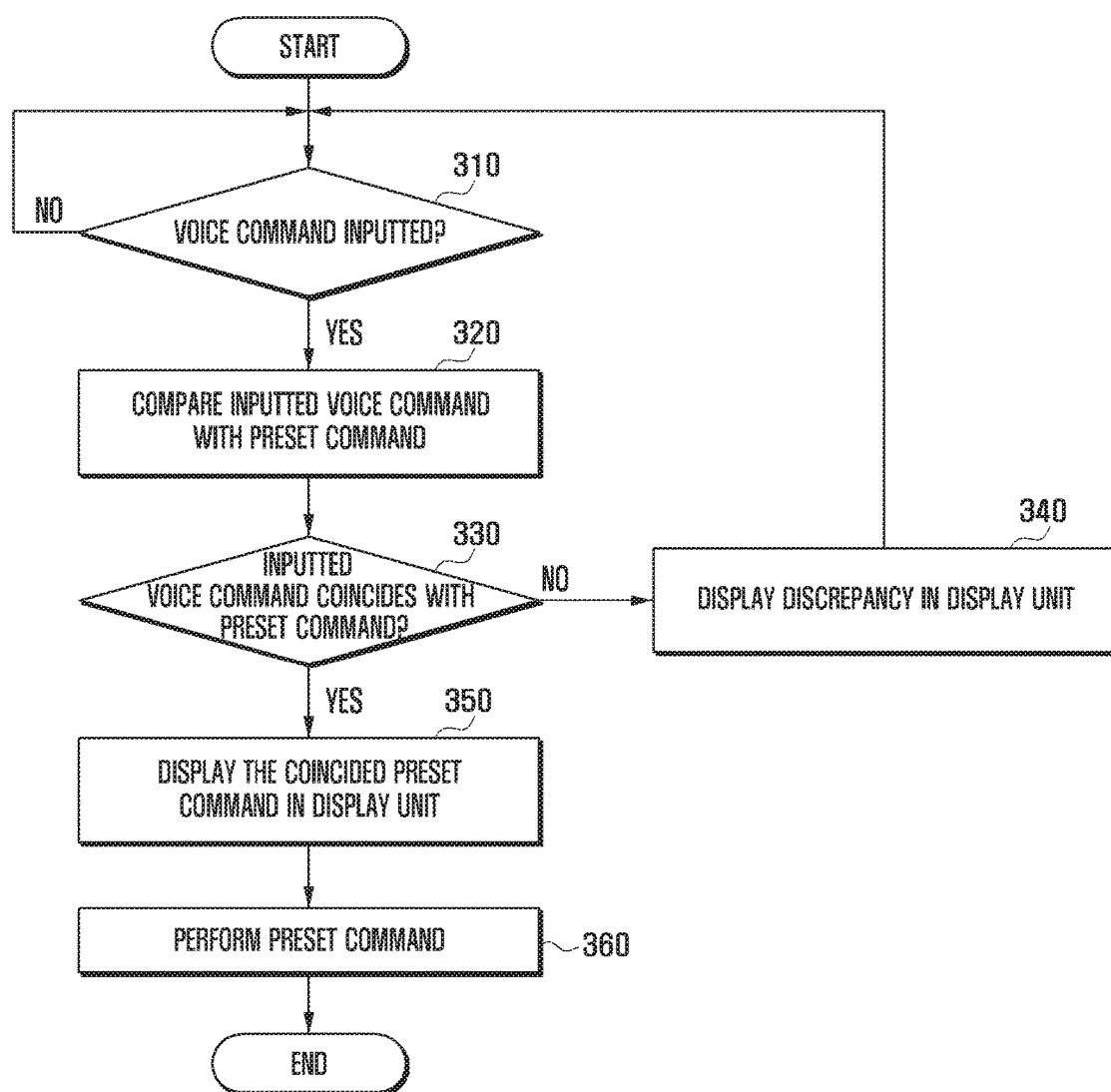
FIG. 3 is a flowchart illustrating a method for controlling a terminal according to an exemplary embodiment of the present invention.

FIG. 3 is a flowchart illustrating a method for controlling a terminal according to an exemplary embodiment of the present invention.

Referring to FIGS. 1 and 3, the terminal may determine whether a voice command has been input at step 310. Such a determination can be made by recognizing a voice input by the voice input unit 112. The voice can be recognized in the state where only the voice input unit 112 and the controller 150 are operated in the terminal depending on the exemplary embodiment of the present invention. According to an exemplary embodiment of the present invention, even if the terminal is in a locked state, voice can be input through the voice input unit 112. If a voice command is input, the terminal is maintained in the operating state. The user may directly input the voice command without separately releasing the locked state of the terminal by inputting the already set voice command even when the terminal is in the locked state.

If a voice command is input, an input voice command may be compared with a command which is set in the terminal at step 320. The above-set command may be set through the existing command setting step. Further, in certain exemplary embodiments of the present invention a terminal may include basically-set commands.

The terminal may determine whether an input voice command corresponds to a preset command at step 330. For example, the terminal may compare the input voice command with the preset command. According to exemplary embodiments of the present invention, the terminal may include a plurality of preset commands depending on user's setting, and an input command may be compared with a plurality of preset commands at step 330. As a result of the comparison, if there is no preset command which corresponds to the input voice command, the terminal may display in the display unit 120 that the input command does not correspond to the preset command at step 340. Further, according to exemplary embodiments of the present invention, the terminal may display that the voice cannot be recognized or that there is no corresponding command. Thereafter, the terminal returns to step 310 and waits for user's voice recognition. However, in other exemplary embodiments of the present invention, step 340 may be selectively performed, and if the input voice command does not correspond to the set command, the terminal may not display a separate user interface on the display unit 120.

If the input voice command corresponds to a preset command at step 330, the preset command may be displayed in the display unit 120 at step 350. Further, operation of a terminal corresponding to the command can be displayed in the display unit 120. Likewise, by displaying a command in the display unit 120, the user can visually check a successful input of a command and operation of the terminal according to the input voice command. The screen corresponding to the voice input can be the content of the voice input command or operation of the terminal corresponding to the command depending on the voice input depending on the exemplary embodiment of the present invention. Further, in other exemplary embodiments of the present invention, step 350 may be optionally performed, and it may be possible for the terminal not to display a separate command.

The terminal may perform the operation corresponding to the preset command along with the release of the locked state at step 360. The corresponding operation may be an operation which is preset by the user.

According to exemplary embodiments of the present invention, by controlling operation of a terminal by using a voice command only, the user's convenience is improved. Further, the user can combine operations according to the input voice, and thus user operability can be improved.

The operation of the terminal corresponding to the operation of the display unit displayed in FIG. 4 will be described later with reference to FIG. 8.

Figure 4:
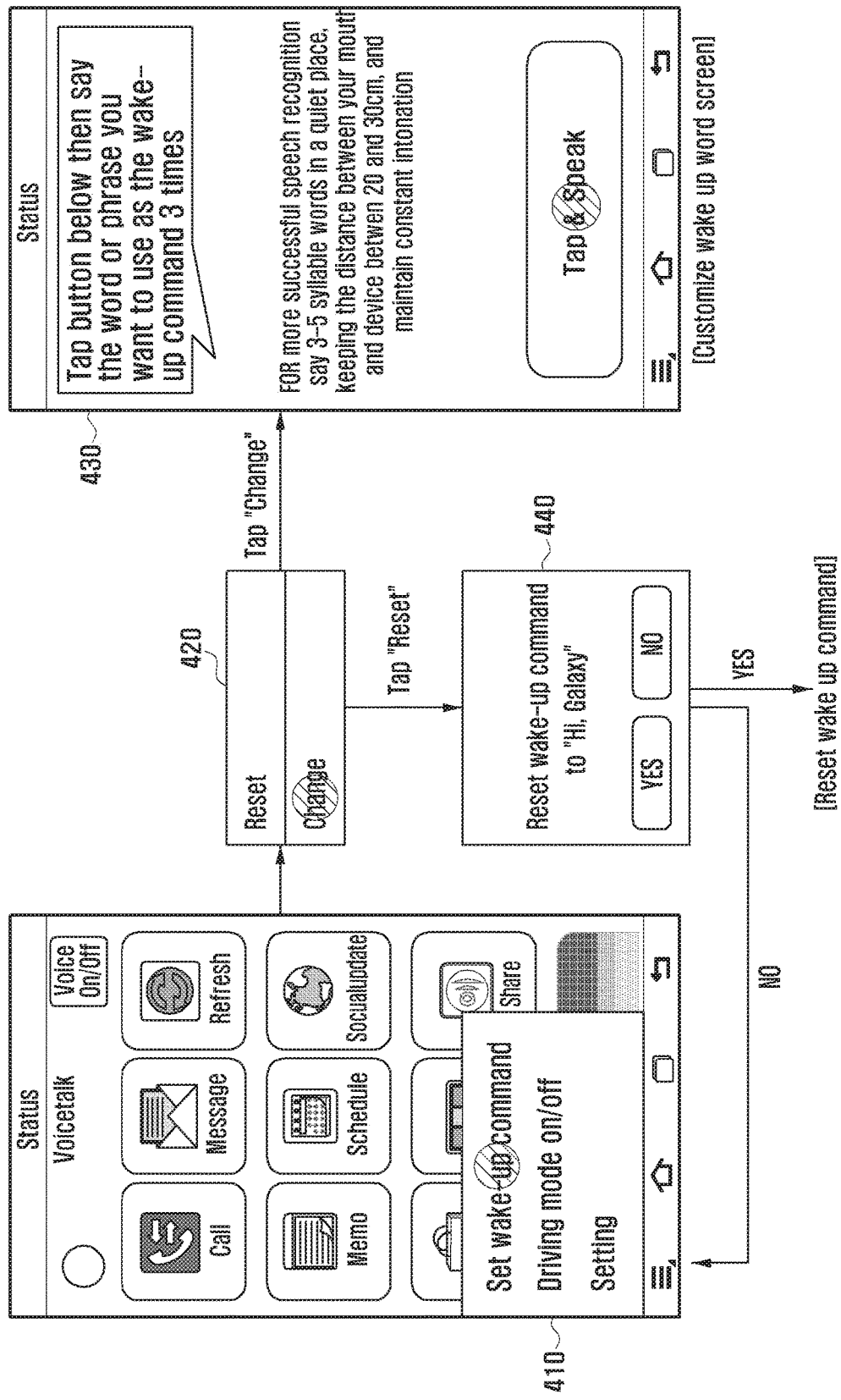
FIG. 4 illustrates a display unit when setting a command according to an exemplary embodiment of the present invention.

FIG. 4 illustrates a display unit when setting a command according to an exemplary embodiment of the present invention.

Referring to FIG. 4, the user can tap a portion of an area for setting a wake-up command at screen 410. The wake-up command may be a command that releases the lock state of the terminal and that converts the terminal state into a state in which a certain command can be input. According to exemplary embodiments of the present invention, a command to be set by the user may be selected in advance, and the user's input may be received. According to an exemplary embodiment of the present invention, the user's voice may be input and the corresponding command may be selected.

The wake-up command can be reset or can be changed by the user's input at screen 420. In the case of selecting the change, the screen is turned into screen 430.

At screen 430, the user can tap "Tap & Speak", and input a command corresponding to a wake-up command. According to exemplary embodiments of the present invention, a command may, for example, be 3 to 5 words. Further, in order to clarify the characteristics of user's voice, an input may be input a plurality of times. For example, the input can be repeated three times. If voice recognition is possible by a repeating a command input three times, a user voice associated with the wake-up command is stored.

At screen 420, in case initialization is set, the screen is turned into screen 440. According to an exemplary embodiment of the present invention, the terminal displays a command directing a wake-up is initialized as "Hi, Galaxy," and the terminal requests confirmation as to whether the user approves the initialization. If the user approves the initialization, the wake-up command is initialized to "Hi, Galaxy," and if not, the screen is turned into screen 410.

According to exemplary embodiments of the present invention, a voice command can be set through the user's input at the existing setting screen, and thus user operability is improved.

The operation of the terminal corresponding to the operation of the display unit displayed in FIG. 5 will be described later with reference to FIG. 9.

Figure 5:
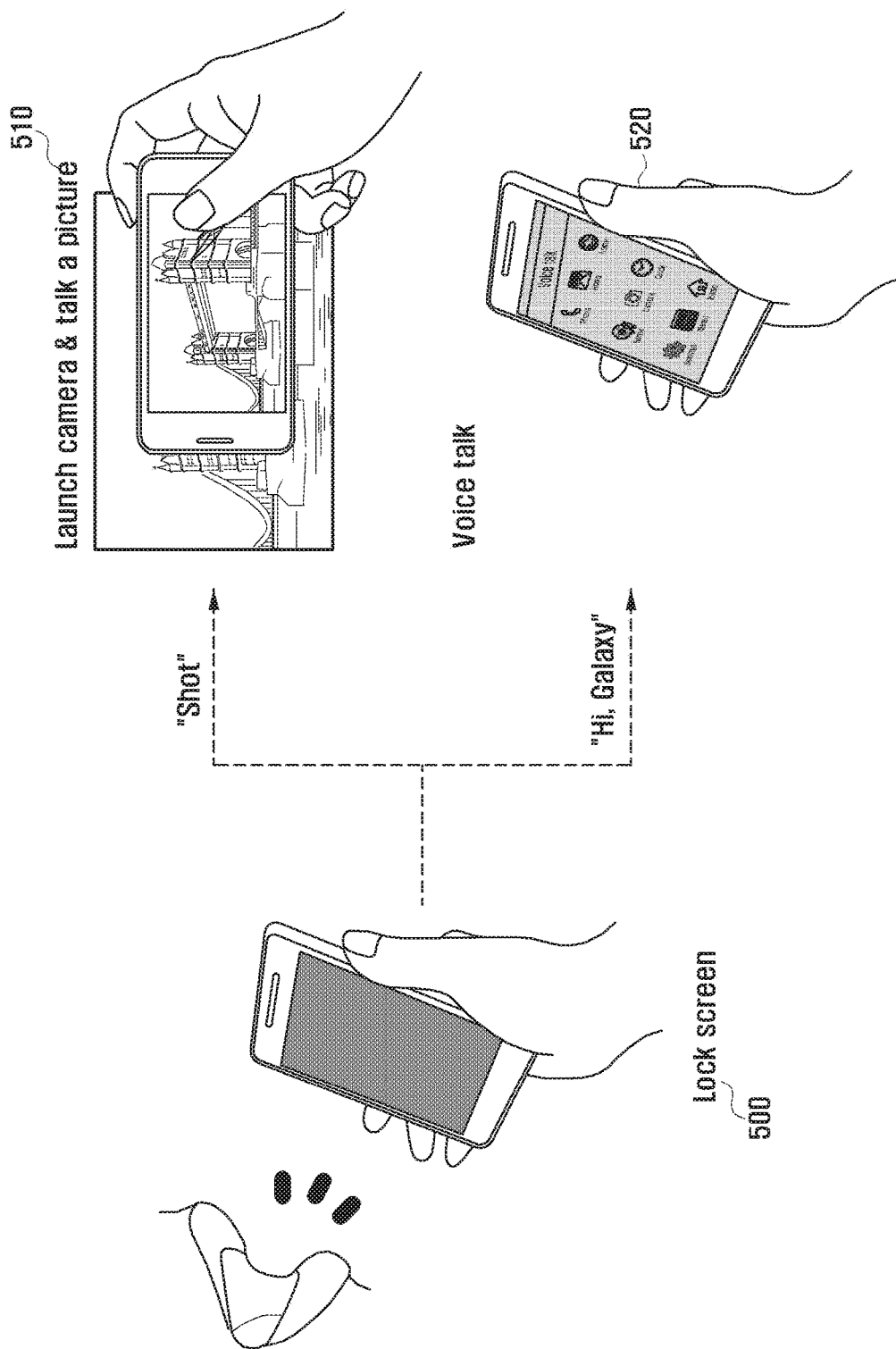
FIG. 5 illustrates a state where a terminal performs an operation corresponding to the voice input according to the type of a user's voice input according to an exemplary embodiment of the present invention.

FIG. 5 illustrates a state where a terminal performs an operation corresponding to the voice input according to the type of a user's voice input according to an exemplary embodiment of the present invention.

Referring to FIGS. 1 and 5, according to an exemplary embodiment of the present invention, a command for changing the mode to the photographing mode by the user's setting has been set as "Shot," and a command for changing the mode to voice talk mode has been set as "Hi, Galaxy."

A voice input can be received when the terminal is in the lock state of reference numeral 500. According to such an exemplary embodiment of the present invention, even if the terminal is in a state in which the display unit 120 is turned off, a user's voice input (e.g., said or spoken) may be received. According to exemplary embodiments of the present invention, if the input command is "Shot," the terminal can release the lock state and the terminal can be changed to a photographing mode of reference numeral 510. Further, if "Shot" is recognized, the terminal may display through the display unit 120 an indication that a command has been successfully recognized before being changed to the photographing mode, and the terminal may then be changed to the photographing mode depending on the exemplary embodiment of the present invention. For example, if the terminal recognizes a voice input corresponding to the input of "Shot," the terminal may automatically load the photographing mode (e.g., load an application corresponding to a camera or video function of the terminal).

According to exemplary embodiments of the present invention, if the input command is "Hi, Galaxy," the terminal may be changed to a voice recognition mode of reference numeral 520. Likewise, if the terminal is changed to a mode in which recognition is possible by only a voice, only the display unit 120 can be turned on in the state in which the lock state with the restriction in a touch is maintained, and the terminal may display that a corresponding operation is performed. Further, according to an exemplary embodiment of the present invention, the lock state may be released, and the terminal mode may be turned into the voice recognition mode. Likewise, maintaining the lock state in the performed command may be changed by the user's setting.

Figure 6:
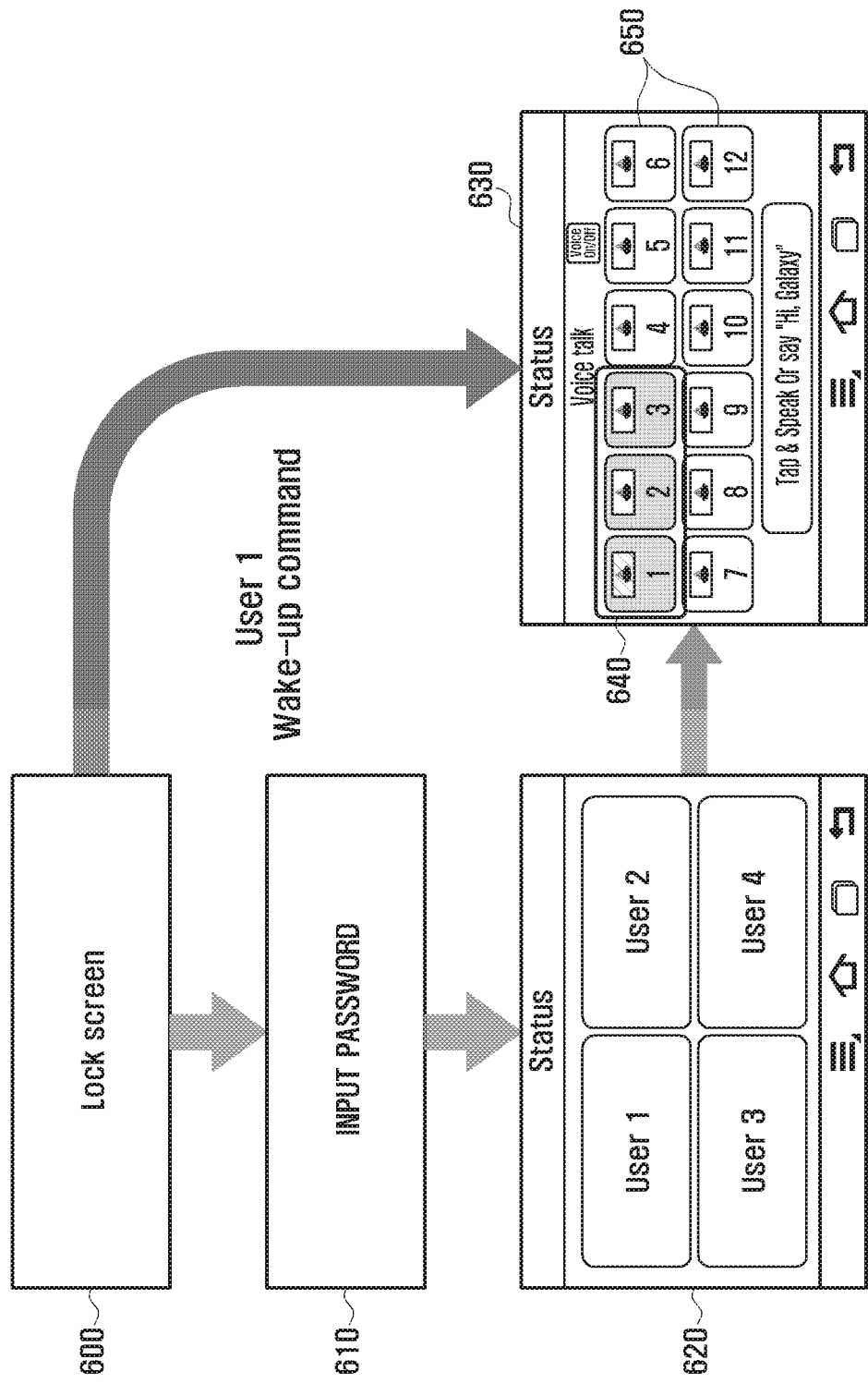
FIG. 6 illustrates a multi-login operation state of a terminal according to a user's voice input according to an exemplary embodiment of the present invention.

FIG. 6 illustrates a multi-login operation state of a terminal according to a user's voice input according to an exemplary embodiment of the present invention.

Referring to FIG. 6, the terminal's operating order can be changed according to user's input in the lock screen state 600.

First, the case of releasing the lock screen state 600 through the existing touch input is described. If the lock screen state 600 is released through a touch input, the state moves to a password input 610. If the password input 610 is performed through a touch input again, a user selection screen 620 in which one of a plurality of users may be selected is displayed.

If a first user (e.g., user 1) is selected from the user selection screen 620, the first user's basic screen 630 may be displayed. Depending on the exemplary embodiment of the present invention, after selecting the first user, before moving to the basic screen 630 of the first user, a step of inputting a password allocated to the first user can be additionally included.

Further, if a voice command is input, which is set as a wake-up command of the first user, is input in the lock screen state 600, the state can move to the basic screen 630 of the first user without a separate selection or a password input. Depending on the exemplary embodiment of the present invention, when setting the first user wake-up command, even if the same word is input (e.g., said) by another user, the terminal may determine that the voice has not been input by the first user by recognizing whether the input corresponded to the first user's voice. Likewise, if the first user inputs a previously-set first user wake-up command, the terminal may directly go to a step of displaying the first user basic screen without passing a password input or a user selection, or the like. Such a setting improves user convenience.

A first user program icon 640 for only the first user and a common program icon 650 for common use may be displayed in the basic screen 630 of the first user. If the program icon is clicked or tapped, a program corresponding to the program icon can be executed. In other exemplary embodiments of the present invention, the program icon 640 for the first user may be determined according to the first user's setting or according to the use frequency of the first user.

According to exemplary embodiments of the present invention, user personalization of the terminal is possible because the types of executable programs may be adjusted in the basic screen for each user.

Figure 7:
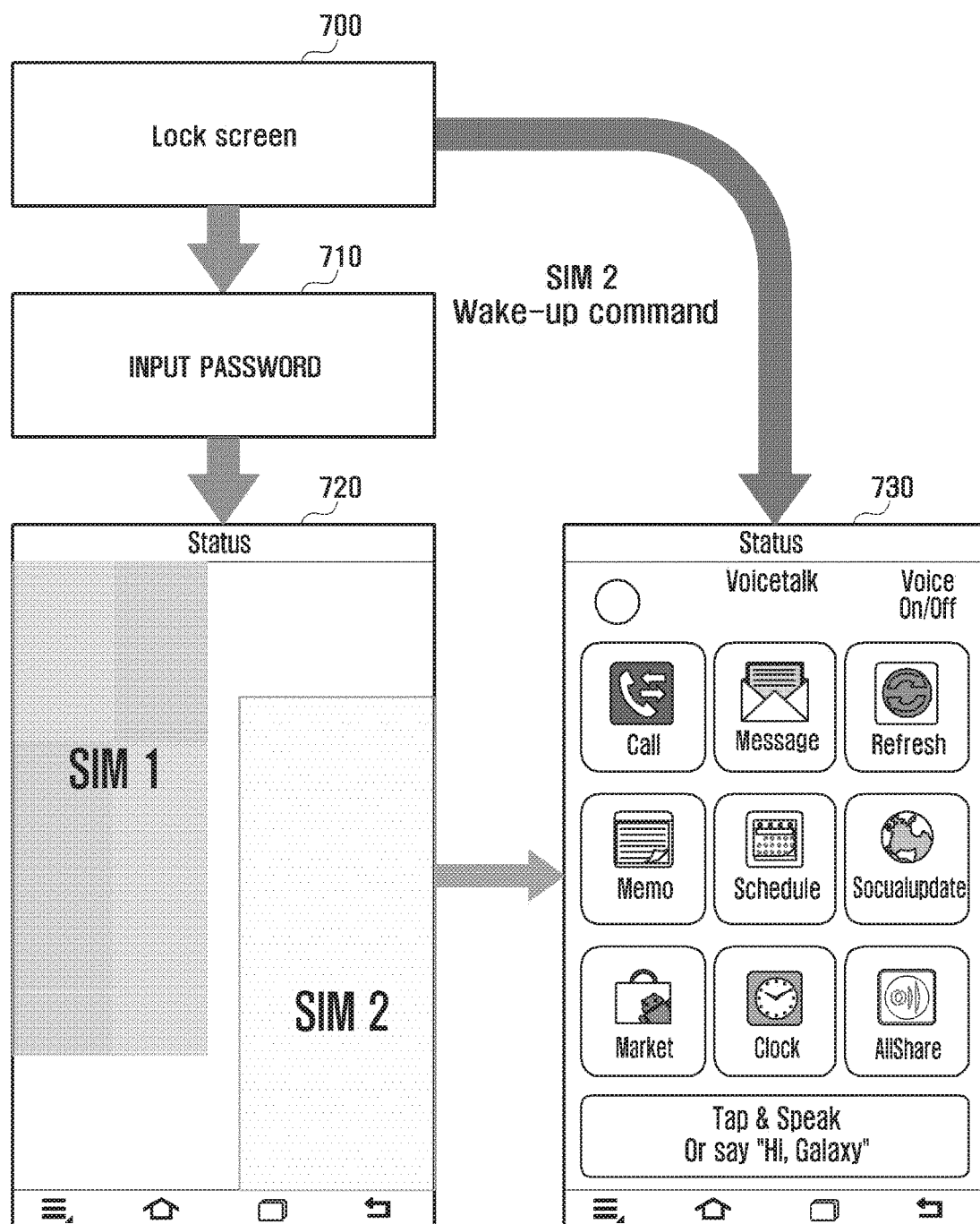
FIG. 7 illustrates a multi-standby operation state of a terminal according to a user's voice input according to an exemplary embodiment of the present invention.

FIG. 7 illustrates a multi-standby operation state of a terminal according to a user's voice input according to an exemplary embodiment of the present invention.

Referring to FIG. 7, a multi-standby terminal can be a terminal including a plurality of SIM chips and using a different SIM chip according to user's setting, and thus in which a connected network or a user ID can be changed.

In a lock screen state 700, an order of operations of a terminal may be changed according to a user's input.

First, an example of the releasing of a lock screen state 700 through the existing touch input is described. If the lock screen state 700 is released through a touch input, the state moves to a password input 710. If the password input 710 is performed through a touch input again, a SIM selection screen 720 for selecting one user from a plurality of SIMs is displayed.

If a second SIM is selected from a SIM selection screen 720, the network is connected to a network allocated to the second SIM, and a basic screen 730 of the second SIM may be displayed. Depending on the exemplary embodiment of the present invention, after selecting the second SIM, before moving to the basic screen 730 of the second SIM, a step of inputting a password allocated to the second SIM can be additionally included.

Further, according to exemplary embodiments of the present invention, when the terminal is in the lock screen state 700, if a voice command, which is set as a wake-up command of the second SIM, is input, the terminal directly move to the basic screen 730 of the second SIM without a separate selection or a password input.

According to exemplary embodiments of the present invention, even in a multi-standby terminal which can selectively connect to a plurality of networks, a network can be set through a preset voice command without a separate touch, and thus user operability is improved.

According to an exemplary embodiment of the present invention, the terminal may control a terminal using (e.g., only) a voice input without a separate operation and the user can set a set of commands according to the voice input, and thus user operability is improved.

Figure 8:
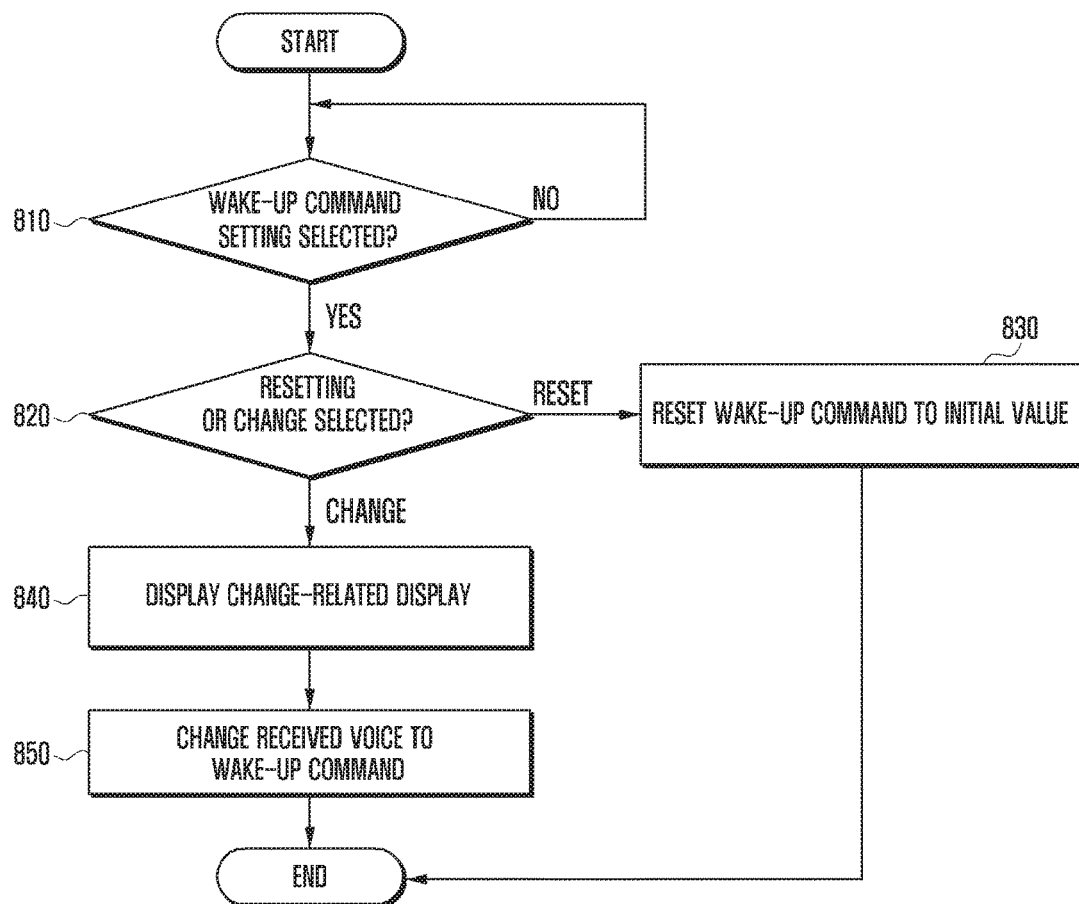
FIG. 8 is a flowchart illustrating operation of a terminal according to an exemplary embodiment of the present invention.

FIG. 8 is a flowchart illustrating operation of a terminal according to an exemplary embodiment of the present invention illustrated in FIG. 4.

Referring to FIGS. 4 and 8, the terminal may determine whether the user has selected the wake-up command setting at step 810. In other exemplary embodiments of the present invention, as illustrated in FIG. 4, the terminal may receive the wake-up command setting from the user by receiving the user's touch input that selects "Set wake-up command".

If the terminal determines that the user has not selected the wake-up command setting at step 810, the terminal may continue to poll for user selection of the wake-up command setting. In contrast, if the terminal determines that the user has selected the wake-up command setting at step 810, the terminal proceeds to step 820.

In step 820, the terminal may display a screen for setting the wake-up command of the terminal according to the input of step 810, and may receive a command for determining whether to reset or change the wake-up command of the terminal. In other exemplary embodiments of the present invention, the command may display a reset or change on the display unit. If the user inputs a command corresponding to resetting the wake-up command, the process moves to step 830. In contrast, if the user selects the command corresponding to changing the wake-up command, the process moves to step 840.

In step 830, the terminal may reset the wake-up command to the initial value. In other exemplary embodiments of the present invention, a user interface as in reference numeral 440 for requesting confirmation of the user before the reset may be displayed on the display unit. The reset value may be a value that the terminal has initially set by the wake-up command. According to an exemplary embodiment of the present invention, the initial set value is "Hi, Galaxy". The user may initialize the wake-up command through step 830.

In step 840, the terminal may display a screen for changing a command on the display unit. In other exemplary embodiments of the present invention, the screen for the change may be a screen as in reference numeral 430. Further, in other exemplary embodiments of the present invention, the screen for the change may include a user interface for inputting a command to be changed. The user interface may include a user interface for receiving the same voice command for more than once so that the terminal may clearly receive the wake-up command.

In step 850, the terminal may change the voice command received in step 840 to a wake-up command. In other exemplary embodiments of the present invention, the terminal may display on the display unit a screen including information indicating that the wake-up command has been changed.

The operation of the terminal described above with reference to FIG. 8 may be performed to reset or change another command for performing an operation set by the user along with the lock release after received by the terminal in the locked state in addition to the wake-up command.

Figure 9:
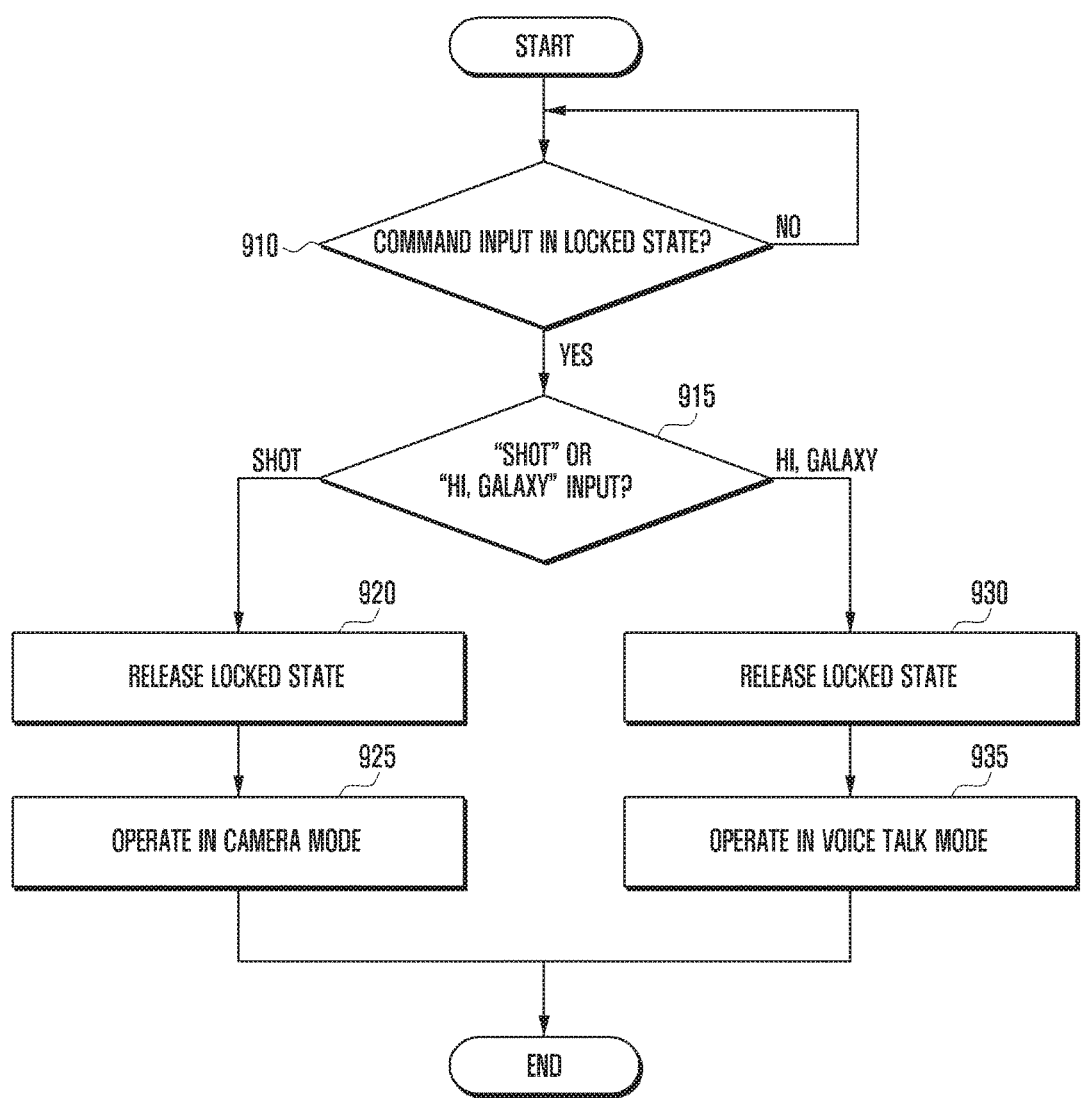
FIG. 9 is a flowchart illustrating operation of a terminal according to an exemplary embodiment of the present invention.

FIG. 9 is a flowchart illustrating operation of a terminal according to an exemplary embodiment of the present invention illustrated in FIG. 5.

Referring to FIGS. 5 and 9, in step 910, the terminal may determine whether a voice command has been input in the locked state. For example, the voice input unit of the terminal may determine the voice command. According to an exemplary embodiment of the present invention, the terminal may turn off the display unit in the locked state and operate the voice input unit, and thus the terminal may receive the user's voice command without turning on the display unit by receiving a separate user's input.

If a voice command has been input in step 910, the process moves to step 915. Conversely, if the voice command has not been input in step 910, the terminal may wait for reception of a voice input.

In step 915, the terminal may compare the voice command that is input in step 910 with the voice command that is set in the terminal. According to an exemplary embodiment of the present invention, the terminal may determine whether the command corresponds to one of the "Shot" command for the photographing and the "Hi, galaxy" command for the wake-up. However, the number of commands that may be compared by the terminal is not limited thereto, and the terminal may compare the set three or more commands. Further, the command for the photographing or the wake-up command may be set differently from "Shot" or "Hi, galaxy".

As a result of the comparison in step 915, if the input voice command is "Shot", the terminal may release the locked state in step 920, and the terminal may operate in a camera mode in step 925. Further, if the user inputs a command for terminating the camera mode according to an exemplary embodiment of the present invention, the camera mode may be terminated, and the process may return back to the locked state.

As a result of the comparison in step 915, if the input voice command is "Hi, galaxy", the terminal may release the locked state in step 930, and the terminal may operate in the voice talk mode in step 935. Further, in other exemplary embodiments of the present invention, the terminal having received the wake-up command may display the initial screen of a certain user or the initial screen of the user using a certain SIM.

Figure 10:
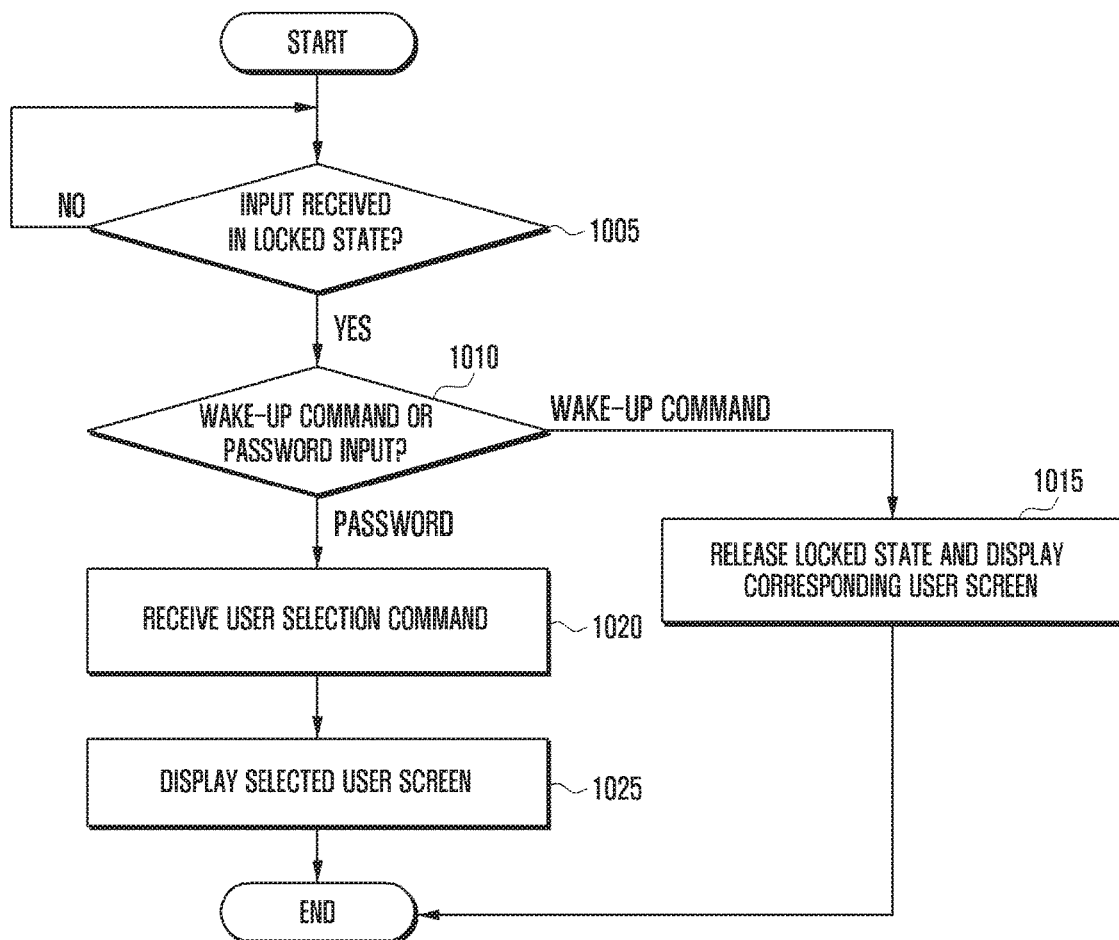
FIG. 10 is a flowchart illustrating operation of a terminal according to an exemplary embodiment of the present invention.

FIG. 10 is a flowchart illustrating operation of a terminal according to an exemplary embodiment of the present invention illustrated in one of FIGS. 6 and 7.

Referring to FIGS. 6, 7 and 10, the terminal may determine whether a command has been input in the locked state in step 1005. The command may include one or more of a voice command and a separate password input. For example, the voice input unit of the terminal may determine the voice command. The password input may be determined by the touch input unit of the terminal. According to exemplary embodiments of the present invention, the terminal may promptly receive the user's voice command without turning on the display unit by receiving a separate user's input by operating the voice input unit. Further, according to exemplary embodiments of the present invention, the terminal may turn on the display unit and receive the password input through the user's certain input. The password input may include at least one of a password corresponding to a certain user and a password of a user using a certain SIM. According to exemplary embodiments of the present invention, an input of a password corresponding to the certain user may be performed as in the operation of the terminal explained with reference to FIG. 6, and an input of a password of a user using the certain SIM may be performed as in the operation of the terminal explained with reference to FIG. 7.

If the terminal determines that a command has not been input in the locked state, then the terminal may continue to poll for an input in the locked state. In contrast, if the terminal determines that a command has been input in the locked state in step 1005, then the terminal proceeds to step 1010.

In step 1010, the terminal may determine whether a command that is input in step 1005 is a wake-up command or a password input. If the input command is the wake-up command in step 1010, the process proceeds to step 1015. Conversely, if the input command is a password input, the process moves to step 1020.

In step 1015, the terminal may release the locked state according to the input wake-up command, and may display the user's initial screen corresponding to the wake-up command. According to exemplary embodiments of the present invention, the SIM user's initial screen corresponding to the wake-up command may be displayed. Likewise, as the user's initial screen or the SIM user's initial screen corresponding to the lock release is displayed according to the wake-up command, the user's initial screen or the SIM user's initial screen may be promptly displayed without a separate user's setting after the lock release, thereby enhancing the user's convenience. Further, according to exemplary embodiments of the present invention, the terminal may promptly display a separate screen or operation mode that is set by the user other than the initial screen according to the wake-up command.

In step 1020, the terminal may receive the user's selection command. Further, according to exemplary embodiments of the present invention, the terminal may receive the SIM user's selection command in step 1020.

In step 1025, the terminal may display the initial screen corresponding to the user selected in step 1020.

It will be appreciated that exemplary embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of non-transitory machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A portable electronic communication device comprising:
   a display;
   a sound input unit; and
   a processor operatively coupled with the sound input unit, the processor configured to:
      receive, using the sound input unit, a sound input while the portable electronic communication device is in a lock screen state, in which the portable electronic communication device is locked, and the display is in an on state,
      determine that the sound input corresponds to a voice input previously stored as a voice of a user corresponding to the portable electronic communication device,
      present information corresponding to at least one portion of the sound input via the display, and
      perform a specified function corresponding to the sound input based at least in part on the determining that the sound input corresponds to the voice input, the specified function including activating at least two applications identified based on the sound input.

2. The portable electronic communication device of claim 1, wherein the processor is further configured to:
   turn off at least one portion of the display while the portable electronic communication device is in the lock screen state.

3. The portable electronic communication device of claim 2, wherein, after performing the specified function, the portable electronic communication device returns to the lock screen state.

4. The portable electronic communication device of claim 1, wherein the processor is further configured to:
   as at least part of the determining, check whether the sound input corresponds to a voice input registered by a user corresponding to the portable electronic communication device.

5. The portable electronic communication device of claim 1,
   wherein the processor is further configured to:

as at least part of the performing of the specified function, transition the portable electronic communication device from the lock screen state to an unlocked state.

6. The portable electronic communication device of claim 5, wherein the processor is further configured to:
set the portable electronic communication device in the lock screen state before the receiving of the sound input based at least in part on a determination that the portable electronic communication device is locked.

7. The portable electronic communication device of claim 1, wherein the processor is further configured to:
as at least part of the performing of the specified function, reproduce multimedia received from an electronic device external to the portable electronic communication device.

8. An apparatus comprising:
a display;
a sound input unit; and
a processor configured to:
receive, using the sound input unit, a sound input while the display is turned off or the apparatus is in a lock screen state, in which the apparatus is locked, and the display is in an on state,
determine that the sound input corresponds to a voice input previously stored as a voice of a user corresponding to the apparatus,
present information corresponding to at least one portion of the sound input via the display, and
perform a specified function corresponding to the sound input while the apparatus is locked based at least in part on the determining that the sound input corresponds to the voice input, the specified function including activating at least two applications identified based on the sound input.

9. The apparatus of claim 8, further comprising communication circuitry, wherein the processor is further configured to:
as at least part of the determining, check that the specified function corresponds to a function to use a specified network; and
as at least part of the performing of the specified command, establish a connection via the specified network using the communication circuitry.

10. The apparatus of claim 8,
wherein the processor is further configured to determine that the sound input corresponds to a specified command prior to the performing of the specified function, and
wherein the apparatus is maintained being locked after performing the specified function.

11. The apparatus of claim 10, further comprising memory, wherein the processor is further configured to:
receive a voice input corresponding to the specified command a plurality of times, and
register characteristics of the voice input in the memory prior to the receiving of the sound input.

12. The apparatus of claim 11, wherein the processor is further configured to:
as at least part of the determining, compare at least one characteristic of the sound input with a corresponding characteristic of the registered characteristics of the voice input.

13. The apparatus of claim 10, wherein the processor is further configured to:

as at least part of the performing of the specified function, present a user interface corresponding to an application capable of voice recognition via the display.

14. The apparatus of claim 8, wherein the processor is further configured to:
as at least part of the performing of the specified function, perform a first specified function based at least in part on a determination that at least one portion of the specified command corresponds to a first specified command, and a second specified function based at least in part on a determination that at least another portion of the specified command corresponds to a second specified command.

15. The apparatus of claim 14,
wherein the at least two applications includes a first application and a second application, and
wherein the processor is further configured to execute the first application to perform the first specified function, and the second application to perform the second specified function, respectively.

16. A portable electronic communication device comprising:
a display;
a sound input unit; and
a processor configured to:
receive, using the sound input unit, a sound input while at least one portion of the display is deactivated and the portable electronic communication device is in a lock screen state,
determine that the sound input corresponds to a voice input previously stored as a voice of a user corresponding to the portable electronic communication device,
present information corresponding to at least one portion of the sound input via the display,
based at least in part on the determining that the sound input corresponds to the voice input, determine that a first portion of the sound input corresponds to a first specified command, and that a second portion of the sound input corresponds to a second specified command, and
perform a first specified function corresponding to the first specified command, and a second specified function corresponding to the second specified command while the portable electronic communication device is locked, based at least in part on the determining that the first portion corresponds to the first specified command, and the second portion corresponds to the second specified command, the first specified function and the second specified function including activating at least two applications identified based on the sound input.

17. The portable electronic communication device of claim 16,
wherein the first portion of the sound input is received while the display is turned off, and
wherein the processor is further configured to:
turn on the display before the second portion of the sound input is received based at least in part on the determining that the first portion of the sound input corresponds to the first specified command.

18. The portable electronic communication device of claim 16,
wherein the at least two applications includes a first application and a second application, and
wherein the processor is further configured to execute the first application corresponding to the first specified function and the second application corresponding to the second specified function, respectively.

19. The portable electronic communication device of claim 18, wherein the processor is further configured to:
perform the first and second specified functions sequentially, the first specified function including a voice recognition application, and the second function including executing, a schedule application, a multimedia application, a camera application, or a message application.

* * * * *